United States Patent [19]
McCafferty

[11] Patent Number: 5,071,319
[45] Date of Patent: Dec. 10, 1991

[54] LOW MAINTENANCE, ADVANCED TECHNOLOGY SWASHPLATE

[75] Inventor: Hugh A. McCafferty, Upper Darby, Pa.

[73] Assignee: The Boeing Company, Seattle, Wash.

[21] Appl. No.: 102,938

[22] Filed: Sep. 30, 1987

[51] Int. Cl.[5] .................. B64C 27/10; B64C 27/52
[52] U.S. Cl. ................................ 416/134 A; 416/230
[58] Field of Search .............. 416/114, 134 A, 230 A

[56] References Cited

U.S. PATENT DOCUMENTS

| | | | |
|---|---|---|---|
| 2,810,443 | 10/1957 | Doman | 416/114 X |
| 2,861,640 | 11/1958 | Du Pont | 416/114 X |
| 3,080,002 | 3/1963 | DuPont | 416/114 |
| 3,448,946 | 6/1969 | Nagatsu | 416/114 |
| 3,558,082 | 1/1971 | Bennie | 416/114 X |
| 3,734,644 | 5/1973 | Garcia | 416/114 |
| 3,933,324 | 1/1976 | Ostrowski | 416/114 X |
| 3,972,491 | 8/1976 | Ferris et al. | 416/114 X |
| 4,326,834 | 4/1982 | Ostrowski | 416/134 A |
| 4,566,856 | 1/1986 | Miller | 416/134 A |
| 4,569,629 | 2/1986 | Ferris et al. | 416/134 |
| 4,580,945 | 4/1986 | Miller | 416/134 |
| 4,611,971 | 9/1986 | Aubry et al. | 416/114 |
| 4,629,644 | 12/1986 | Matuska | 416/134 A X |
| 4,630,998 | 12/1986 | Leman et al. | 416/114 X |
| 4,708,591 | 11/1987 | Roman | 416/134 A X |
| 4,804,315 | 2/1989 | Ferris et al. | 416/134 A |

FOREIGN PATENT DOCUMENTS 2163395 2/1986 United Kingdom ............ 416/114

Primary Examiner—Edward K. Look
Assistant Examiner—Hoang Nguyen
Attorney, Agent, or Firm—Jones, Tullar & Cooper

[57] ABSTRACT

In the control system for a helicopter rotor a rotating diaphragm driveably connects a rotating swashplate ring to the rotor shaft or to the underside of the rotor hub. The diaphragm is flexible with respect to displacement along and rotation about the rotor shaft axis. A centering plate connected to the stationary ring of the swashplate provide a small gap at the rotor shaft circumference sufficient to permit swashplate tilting and to maintain an acceptable tolerance. A stationary diaphragm connects the stationary ring of the swashplate to the airframe to prevent rotation of the stationary ring and to fix the radial portion of the ring centered about the rotor shaft.

13 Claims, 3 Drawing Sheets

LOW MAINTENANCE, ADVANCED TECHNOLOGY SWASHPLATE

BACKGROUND OF THE INVENTION

1. Field of the Invention

This invention relates to the control system for a helicopter rotor, more particularly it relates to the position of the upper controls that drives the rotating ring and holds the stationary ring.

2. Description of the Prior Art

Conventional helicopter rotor control systems drive the swashplate rotating ring through scissor assemblies, which include spherical rod end bearings whose average service life is short because their failure rate is higher than the average for components of the system. A large number of maintenance problems occur in the swashplate assembly due to wear, binding, looseness and excessive end play of duplex bearings present in the assembly. These problems with swashplate bearings are generally attributed to peak loads applied to the swashplate by the boost actuator input by the lower controls.

In conventional rotor assemblies for helicopters the swashplate is centered on the axis of the rotor shaft by a ball slider contacting a slider guide shaft. Ball slider guide assemblies are costly and prone to wear. Looseness in the rotor control system resulting from wear degrades flying quality, and the removal and replacement of the ball slider assembly is a major overhaul task. For military helicopters the vulnerability of ball slider assemblies to jamming by, for example, a 12.7 mm round is a serious concern.

These difficulties can be overcome if the rigid metal components of the rotor control system and the spherical rod end bearings and ball bearing required to permit rotational freedom among the components of the system were replaced with flexible members able to deflect under load sufficiently to permit the required rotational freedom. Modern composite materials such as fiber reinforced, polymer resin matrices have properties particularly suitable for this purpose. When such materials are used to form large thin components the requisite flexibility is inherent and their size permits the control forces and rotor load to be carried by the components at relative low stress levels compared to metal components.

Various attempts to incorporate flexible diaphragms in helicopter control systems have been made. U.S. Pat. No. 4,326,834 describes the use of a pair of annular flexible diaphragms located in the rotor hub and connecting the rotor shaft to the radially outer periphery of the rotor hub. These diaphragms are pretensioned and operate to resist axial displacement of the hub relative to the rotor shaft and to resist angular displacement of the plane of rotation of the hub relative to a place normal to the rotor shaft axis. A sleeve rotates with the rotor shaft and has a plate connecting the sleeve to the pitch links for canting the rotor hub as the sleeve is moved on the rotor shaft. Cyclic pitch is transmitted as the sleeve structure tilts relative to the sleeve but the swashplate does not move vertically for collective input and tilt for cyclic input. If cyclic control is held fixed and collective control is moved the control system does not transmit collective pitch control from the sleeve to the sleeve structure because cables directly attach the sleeve structure to the cyclic control stick. It is preferable to transmit collective and cyclic control from the actuators to the blades without feedback or lockout.

Flexible diaphragms used to connect and partially support helicopter rotor blades on the rotor shaft are described in U.S. Pat. Nos. 4,566,856; 4,569,629; and 4,580,945.

SUMMARY OF THE INVENTION

A helicopter rotor assembly according to this invention employs flexible composite material diaphragms in entirely different ways from those of the prior art. Here a rotating diaphragm is connected to the rotating ring of the swashplate and to the rotor shaft or another suitable component, directly driven by the rotor shaft, such as the rotor shaft. This diaphragm transmits torque from the rotor shaft to the swashplate and replaces the conventional costly rotating scissors. The diaphragm is flexible enough to permit virtually unrestricted movement of the swashplate vertically and rotatably with respect to the rotor shaft, yet it can transfer large rotor torque from the shaft to the swashplate. The rotating scissors assembly is subject to failure particularly at the spherical bearings.

To maintain the swashplate centrally located about the rotor shaft a plate mounted on the stationary ring of the swashplate encircles the rotor shaft with a small gap therebetween to permit unobstructed tilting of the swashplate relative to the rotor shaft.

A stationary diaphragm encircles the rotor shaft and connects the airframe structure, transmission casing or other suitable immoveable structure to the stationary swashplate ring. This diaphragm prevents rotation of the stationary ring that would otherwise occur due to torque transmittal across the duplex swashplate bearing from the rotating ring to the stationary ring. It also holds the radial portion of the swashplate fixed and centered with respect to the rotor shaft axis.

Holes are provided through the diaphragms to permit pitch links, the longitudinal link, lateral link and stationary scissors to pass through. Each diaphragm is relieved at its central axis to permit the rotor shaft to pass through.

DESCRIPTION OF THE PREFERRED EMBODIMENT

Figure 2:
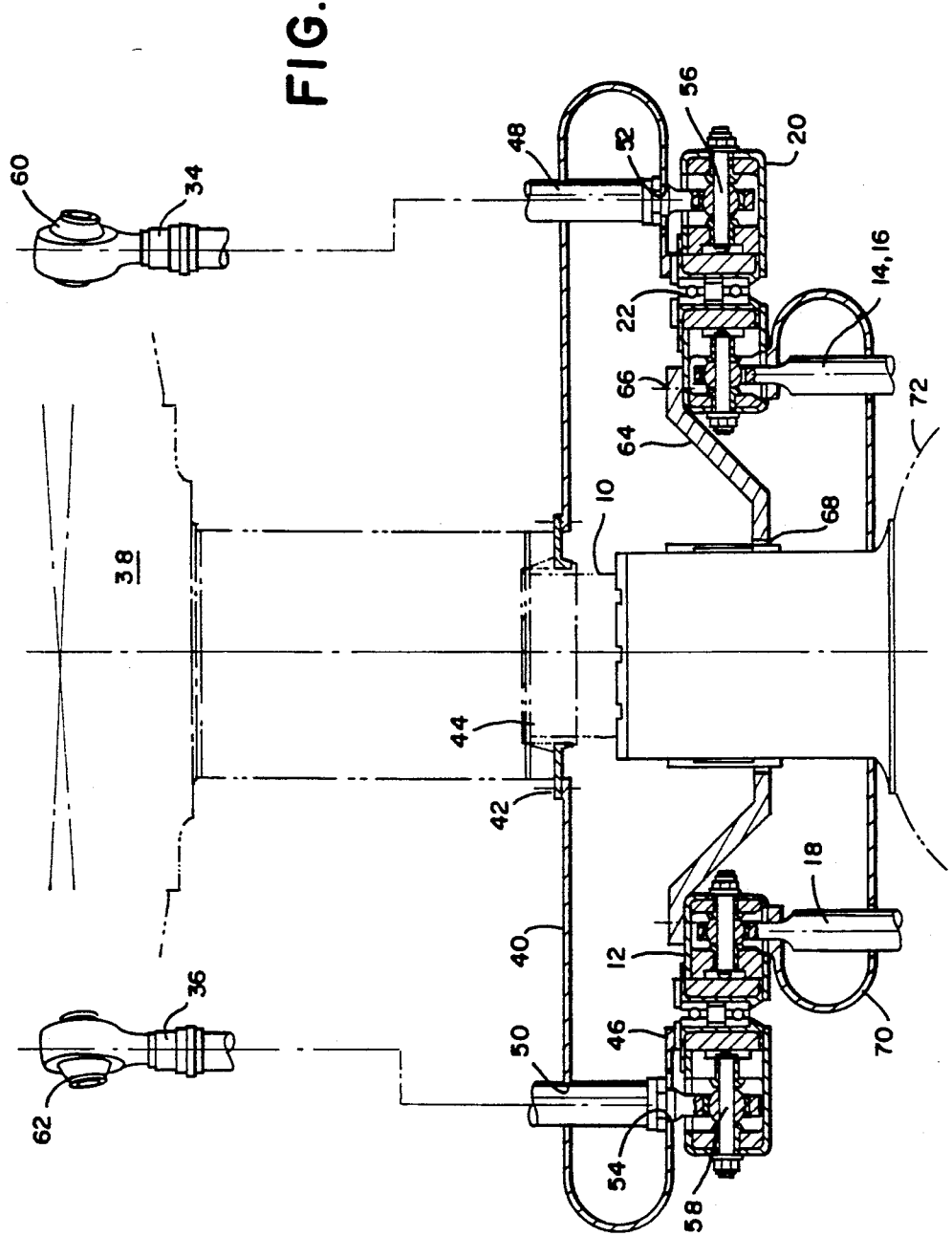
FIG. 2 is a partial cross section through the mid-plane of the rotor shaft of a helicopter rotor and rotor control system showing components of the upper controls rotated into the cross section.
Figure 3:
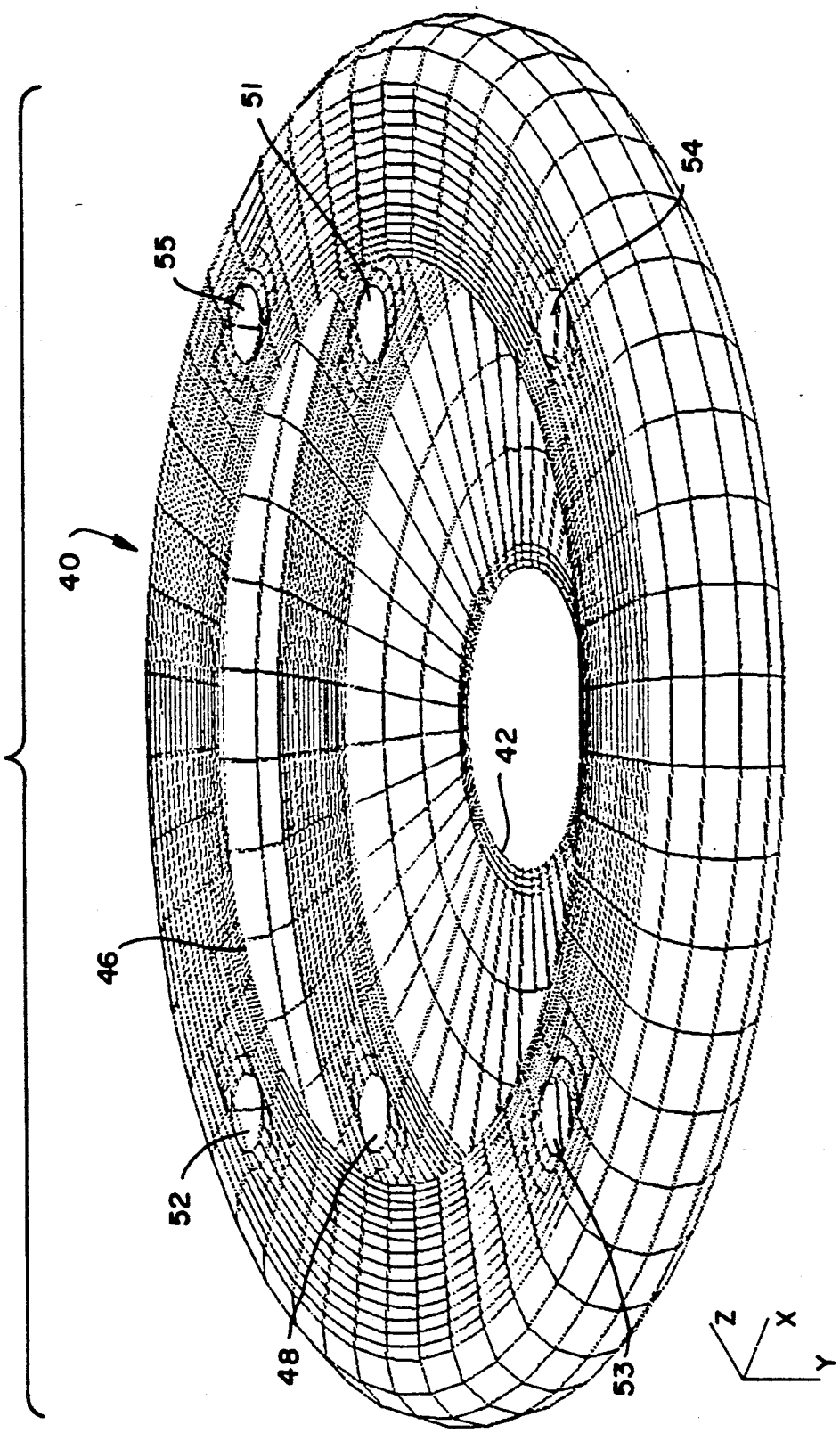
FIG. 3 is a mathematic computer model of the rotating diaphragm viewed from below toward the upper surface.

Referring first to FIG. 2 a helicopter rotor system for use with the present invention includes a rotor shaft 10, a stationary ring 12, two longitudinal links 14, 16 spaced angularly about the axis of the rotor shaft, and a lateral link 18, which functions as does a stationary scissors. Located between the stationary ring 12 and rotating ring 20 is a duplex set of angular contact ball bearings 22 having integral seals.

Figure 1:
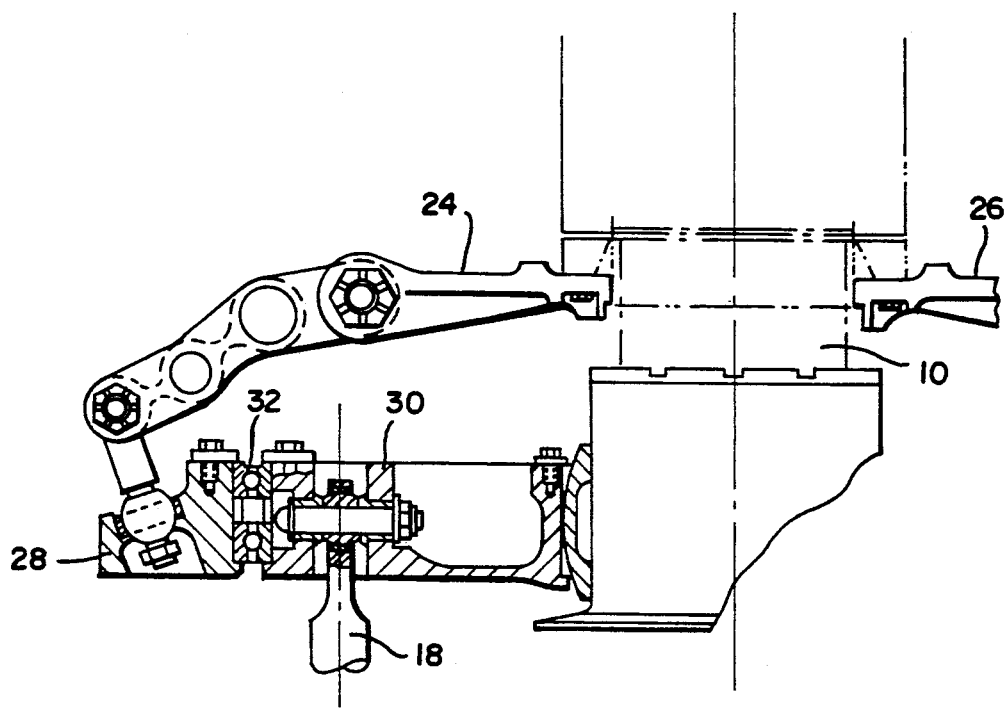
FIG. 1 is a partial cross section at a helicopter rotor showing the swashplate ring, rotating scissors, and ball slider mechanism for centering the swashplate.

Conventionally the rotating ring is driven by two rotating scissors assemblies 24, 26 spaced angularly about the rotor shaft axis diametrically opposite one another. FIG. 1 shows the arrangement of the rotating scissors and their conventional attachment to the rotating ring 28 and a conventional stationary ring 30 mounted on ring 28 by bearings 32.

Four pitch links 34-37 connect rotating ring 12 to the pitch horn on the rotor hub 38, whereby the collective pitch of the rotor blades, supported on the rotor, varies as the blades rotate around the rotor shaft axis in accordance with the position and attitude of the rotating ring with respect to the rotor.

In FIG. 2 an upper diaphragm 40 replaces the rotating scissors and driveably connects the rotor shaft to the rotating ring. The connection to the drive shaft is made by a mechanical attachment 42 to a collar 44 joined to the rotor shaft. Alternatively, the upper surface of diaphragm 40 is connected to the underside of the rotor hub. A mechanical connection 46 is used to locate and fix the lower surface of the diaphragm to the upper surface of ring 20. The diaphragm transmits torque from the hub 38 or rotor shaft 10 to the rotating ring 20, resists forces parallel to the plane of the rotating ring, and properly locates the bottom of the pitch links with respect to the rotor. The upper surface of diaphragm 40 has four holes 48-51 and its lower surface has four corresponding holes 52-55 aligned angularly with the upper surface hole to permit the pitch links to extend through the diaphragm from the rotor to the mechanical attachments 56-58 of the pitch links to the rotating swashplate ring. Each end of the pitch link carries a spherical bearing 60, 62 to facilitate unobstructed rotation of the hub relative to ring 20.

The diaphragm can be fabricated from composite material that includes a flexible resin such as Epon 828 with Dow Chemical Company Meta Phenylene Diamene, MPDA, or a stiffer resin system. Glass fabric such as S-2 glass fabric, Narmco Corporation type 7781 class III grade 1, or E glass fabric covered with the resin will be fabricated in sheet form to shape while the resin is in the B-stage and subsequently placed in an autoclave to polymerize the resin at elevated temperature and with a suitable vacuum to draw entrained air from the resin and at elevated pressure to correctly hold the glass fiber and resin in the desired shape on a forming tool.

The diaphragm shape is inherently flexible normal to its upper surface, and its stability, particularly with regard to torsional buckling, must be compatible with the highest magnitude of rotor torque it must transmit of the rotating ring. The rotor will tilt as much as 15° with respect to the rotating ring; therefore, the diaphragm, while rotating at rotor speed, must be able to transmit full rotor torque between the rotor shaft and rotating ring while its upper attachment 42 is angularly offset about a lateral axis relative to the lower attachment 46.

A rigid plate 64 is mechanically attached to the stationary ring at a bolt circle 66, extends downward and radially inward toward the rotor shaft and terminates adjacent the shaft but separated from it by a small radial gap 68. Plate 64 protects the swashplate rings 12, 20 and the upper diaphragm 40 against the affect of in-plane forces tending to move that assembly radially off-center. The gap is set to provide sufficient clearance to allow maximum swashplate tilt in any direction without contact with the plate.

A stationary, lower diaphragm 70 is attached to the underside of the stationary ring 12 by mechanical attachments and to the top of the transmission cover or to the ring 12 and the cover 72. Diaphragm 70 transmits torque between ring 12 and the cover 72 or airframe, and thereby resists rotation of ring 12 that would otherwise result due to drag transmittal through duplex bearing 22 from rotating ring 20. Diaphragm 70 resists forces in the plane of the swashplate tending to move the assembly radially from the axis of the rotor shaft.

The composite material and fabrication technique of plate 64 and diaphragm 70 are the same as those for diaphragm 40. Plate 64 when used with either of the diaphragms provides standby redundance to center the swashplate if either diaphragm is unable to perform this function.

I claim:

1. A rotor assembly for a helicopter comprising:
a rotor;
a rotor shaft for transmitting power to the rotor;
a swashplate including a stationary ring, a rotating ring and a bearing supporting the rotating ring on the stationary ring for rotation relative to the stationary ring; and
a rotating disc-shaped flexible diaphragm located along the rotor shaft between the rotor and the swashplate and extending between the rotor shaft and the swashplate, driveably connecting the rotor shaft and the rotating ring, said diaphragm being flexible in the direction normal to its extent.

2. The assembly of claim 1 wherein the rotating flexible diaphragm is fabricated from composite material having a fiber reinforced polymer resin matrix.

3. The assembly of claim 1 wherein the rotating flexible diaphragm has a central hole through which the rotor shaft passes, and wherein the rotating diaphragm driveably connects the rotor and the rotating ring.

4. The assembly of claim 1 further comprising a stationary disc-shaped diaphragm, encircling the rotor shaft, located between the swashplate and the airframe of the helicopter, connecting the stationary ring and the airframe and providing a torsional load path therebetween.

5. The assembly of claim 1 further comprising a stationary disc-shaped diaphragm, encircling the rotor shaft, located between the swashplate and the transmission cover of the helicopter, connecting the stationary ring and the transmission cover and providing a torsional load path.

6. The assembly of claim 5 wherein the stationary diaphragm is fabricated from composite material having a fiber reinforced polymer resin matrix.

7. The assembly of claim 5 wherein the stationary ring has a central hole through which the rotor shaft passes.

8. A rotor assembly for a helicopter comprising:
a rotor;
a rotor shaft for transmitting power to the rotor;
a swashplate including a stationary ring, a rotating ring and a bearing supporting the rotating ring on the stationary ring for rotation relative to the stationary ring;
a rotating disc-shaped flexible diaphragm located between the rotor and the swashplate and extending between the rotor shaft and the swashplate, driveably connecting the rotor shaft and the rotating ring, said diaphragm being flexible in the direction normal to the extent; and
a plate fixed to the swashplate and extending radially inward toward the rotor shaft, encircling the rotor shaft, and providing an adjacent surface for centering the swashplate about the axis of the rotor shaft.

9. The assembly of claim 8 wherein the plate is connected to the stationary ring of the swashplate.

10. The assembly of claim 8 wherein the plate is fabricated from composite material having a fiber reinforced polymer resin matrix.

11. A rotor assembly for a helicopter comprising:
a rotor;
a rotor shaft for transmitting power to the rotor;
a swashplate including a stationary ring, a rotating ring and a bearing supporting the rotating ring on the stationary ring for rotation relative to the stationary ring;
a rotating disc-shaped flexible diaphragm located between the rotor and the swashplate and extending between the rotor shaft and the swashplate, driveably connecting the rotor shaft and the rotating ring, said diaphragm being flexible in the direction normal to the extent;
a plate fixed to the swashplate and extending radially inward toward the rotor shaft, encircling the rotor shaft, and providing an adjacent surface for entering the plate about the axis of the rotor shaft; and
a stationary disc-shaped diaphragm, encircling the rotor shaft, located between the swashplate and the airframe of the helicopter, connecting the rotating ring and the airframe and providing a torsional load path therebetween.

12. A rotor assembly for a helicopter comprising:
a rotor;
a rotor shaft for transmitting power to the rotor;
a swashplate including a stationary ring, a rotating ring and a bearing supporting the rotating ring on the stationary ring for rotation relative to the stationary ring;
a rotating disc-shaped flexible diaphragm located between the rotor and the swashplate and extending between the rotor shaft and the swashplate, driveably connecting the rotor shaft and the rotating ring, said diaphragm being flexible in the direction normal to the extent; and
pitch links connected to the rotating ring and the rotor and wherein the rotating disc-shaped flexible diaphragm has holes through which the pitch links extend and on the surfaces of which the pitch links are located angularly and radially with respect to the rotor.

13. A rotor assembly for a helicopter comprising:
a rotor;
a rotor shaft for transmitting power to the rotor;
a swashplate including a stationary ring, a rotating ring and a bearing supporting the rotating ring on the stationary ring for rotation relative to the stationary ring;
a rotating disc-shaped flexible diaphragm located between the rotor and the swashplate and extending between the rotor shaft and the swashplate, driveably connecting the rotor shaft and the rotating ring, said diaphragm being flexible in the direction normal to the extent;
a stationary disc-shaped flexible, encircling the rotor shaft, located between the swashplate and the transmission cover of the helicopter, connecting the stationary ring and the transmission cover and providing a torsional load path; and
a lateral link and a longitudinal link connected to the rotating ring, and wherein the rotating diaphragm has holes through which a lateral link and a longitudinal link extend.

* * * * *

UNITED STATES PATENT AND TRADEMARK OFFICE
CERTIFICATE OF CORRECTION

PATENT NO. : 5,071,319
DATED : December 10, 1991
INVENTOR(S) : Hugh A. McCafferty It is certified that error appears in the above-identified patent and that said Letters Patent is hereby corrected as shown below:

Claim 11, column 5, line 22, "the extent" should be "its extent".

Claim 13, column 6, line 28, "diaphragm" should be inserted between "flexible" and the ",".

Signed and Sealed this

Eighteenth Day of May, 1993

*Attest:*

MICHAEL K. KIRK

*Attesting Officer*  Acting Commissioner of Patents and Trademarks